United States Patent
Rönpagel

(10) Patent No.: US 11,975,227 B2
(45) Date of Patent: May 7, 2024

(54) METHOD FOR PRODUCING A PIPE ELEMENT, PARTICULARLY A PIPE ELEMENT OF A FIRE-EXTINGUISHING FACILITY, PIPE ELEMENT AND PIPE SYSTEM COMPRISING SAME

(71) Applicant: Minimax Viking Research & Development GmbH, Bad Oldesloe (DE)

(72) Inventor: Andreas Rönpagel, Bad Oldesloe (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 667 days.

(21) Appl. No.: 17/252,724

(22) PCT Filed: Jun. 27, 2019

(86) PCT No.: PCT/EP2019/067106
§ 371 (c)(1),
(2) Date: Dec. 15, 2020

(87) PCT Pub. No.: WO2020/002486
PCT Pub. Date: Jan. 2, 2020

(65) Prior Publication Data
US 2021/0154506 A1 May 27, 2021

(30) Foreign Application Priority Data
Jun. 27, 2018 (DE) .................... 10 2018 115 506.9

(51) Int. Cl.
A62C 35/68 (2006.01)
B23K 9/02 (2006.01)
(Continued)

(52) U.S. Cl.
CPC ............ *A62C 35/68* (2013.01); *B23K 9/02* (2013.01); *F16L 13/02* (2013.01); *F16L 41/082* (2013.01);
(Continued)

(58) Field of Classification Search
CPC ...... A62C 35/68; B23K 9/02; B23K 2101/10; F16L 13/02; F16L 58/1009
(Continued)

(56) References Cited

U.S. PATENT DOCUMENTS

| 1,966,403 A | 7/1934 | Durham |
| 2,915,324 A | 12/1959 | Jackson |

(Continued)

FOREIGN PATENT DOCUMENTS

| DE | 1 627 629 | 10/1970 |
| DE | 16 27 629 B1 | 10/1970 |

(Continued)

OTHER PUBLICATIONS

International Search Report (with English translation), International Application No. PCT/EP2019/067106, 6 pages (Sep. 23, 2019).

*Primary Examiner* — David R Deal
(74) *Attorney, Agent, or Firm* — Perkins Coie LLP

(57) ABSTRACT

The invention relates to a method for producing a pipeline of a fire extinguishing installation. The method includes providing a first hollow body and a second hollow body, positioning the hollow bodies relative to one another in a welding zone such that the connection of the hollow bodies can be performed in the welding zone, positioning a collecting container within the first and/or second hollow body in the region of the welding zone, welding the first hollow body to the second hollow body in the welding zone such that the pipeline element is obtained, wherein a fully encircling weld seam is generated which has a root extending on (Continued)

the inside of the pipeline element; and collecting, by the collecting container, weld spatter that occurs on the inside of the pipeline element during the welding process.

24 Claims, 6 Drawing Sheets

(51) Int. Cl.
*B23K 101/10* (2006.01)
*F16L 13/02* (2006.01)
*F16L 41/08* (2006.01)
*F16L 58/10* (2006.01)

(52) U.S. Cl.
CPC ...... *F16L 58/1009* (2013.01); *B23K 2101/10* (2018.08)

(58) Field of Classification Search
USPC .......................................... 138/155
See application file for complete search history.

(56) References Cited

U.S. PATENT DOCUMENTS

| | | | | |
|---|---|---|---|---|
| 4,178,022 | A * | 12/1979 | Hanneman | F16L 13/04 138/155 |
| 4,323,223 | A | 4/1982 | Noll | |
| 8,397,766 | B2 * | 3/2013 | Rosen | B29C 66/1142 285/55 |
| 9,791,091 | B2 * | 10/2017 | Yodogawa | F16L 9/22 |
| 10,413,765 | B2 | 9/2019 | Rönpagel et al. | |
| RE48,284 | E | 10/2020 | Rönpagel et al. | |
| 2002/0195158 | A1 * | 12/2002 | Turner | F16L 59/20 138/155 |
| 2002/0195426 | A1 | 12/2002 | Vasudeva et al. | |
| 2003/0080552 | A1 * | 5/2003 | Genoni | F16L 47/03 285/21.2 |
| 2012/0111637 | A1 | 5/2012 | Chen et al. | |
| 2012/0111837 | A1 | 5/2012 | Al-Mostaneer et al. | |
| 2015/0322288 | A1 | 11/2015 | Wasserfallen et al. | |
| 2018/0031152 | A1 | 2/2018 | Rajagopalan et al. | |
| 2019/0009354 | A1 * | 1/2019 | Atin | B23K 37/0276 |
| 2019/0358477 | A1 | 11/2019 | Rönpagel et al. | |
| 2021/0254777 | A1 | 8/2021 | Rönpagel et al. | |
| 2021/0262594 | A1 | 8/2021 | Rönpagel et al. | |

FOREIGN PATENT DOCUMENTS

| | | |
|---|---|---|
| DE | 10 2016 001 294 A1 | 8/2017 |
| EP | 0036571 | 9/1981 |
| EP | 0344896 | 12/1989 |
| EP | 0 402 648 A2 | 12/1990 |
| EP | 1 270 132 | 1/2003 |
| EP | 2 623 163 A1 | 8/2013 |
| EP | 2 766 653 B1 | 11/2016 |
| FR | 770 571 A | 9/1934 |
| FR | 2311980 | 12/1976 |
| KR | 2019 0042233 | 4/2019 |
| WO | WO 2020/002498 A1 | 1/2020 |
| WO | WO 2020/002502 A1 | 1/2020 |
| WO | WO 2020/002542 A2 | 1/2020 |
| WO | WO 2022/136644 | 6/2022 |

* cited by examiner

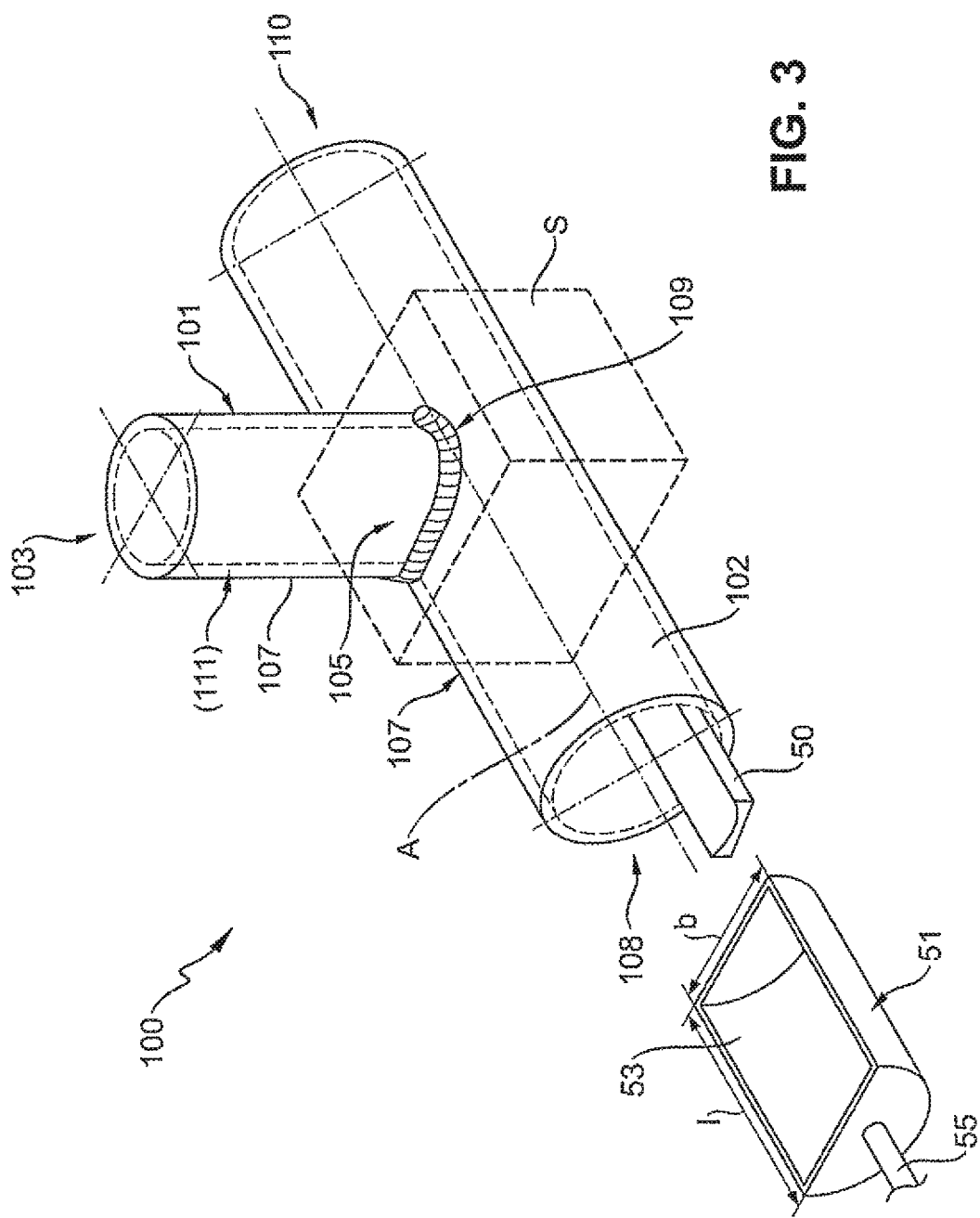

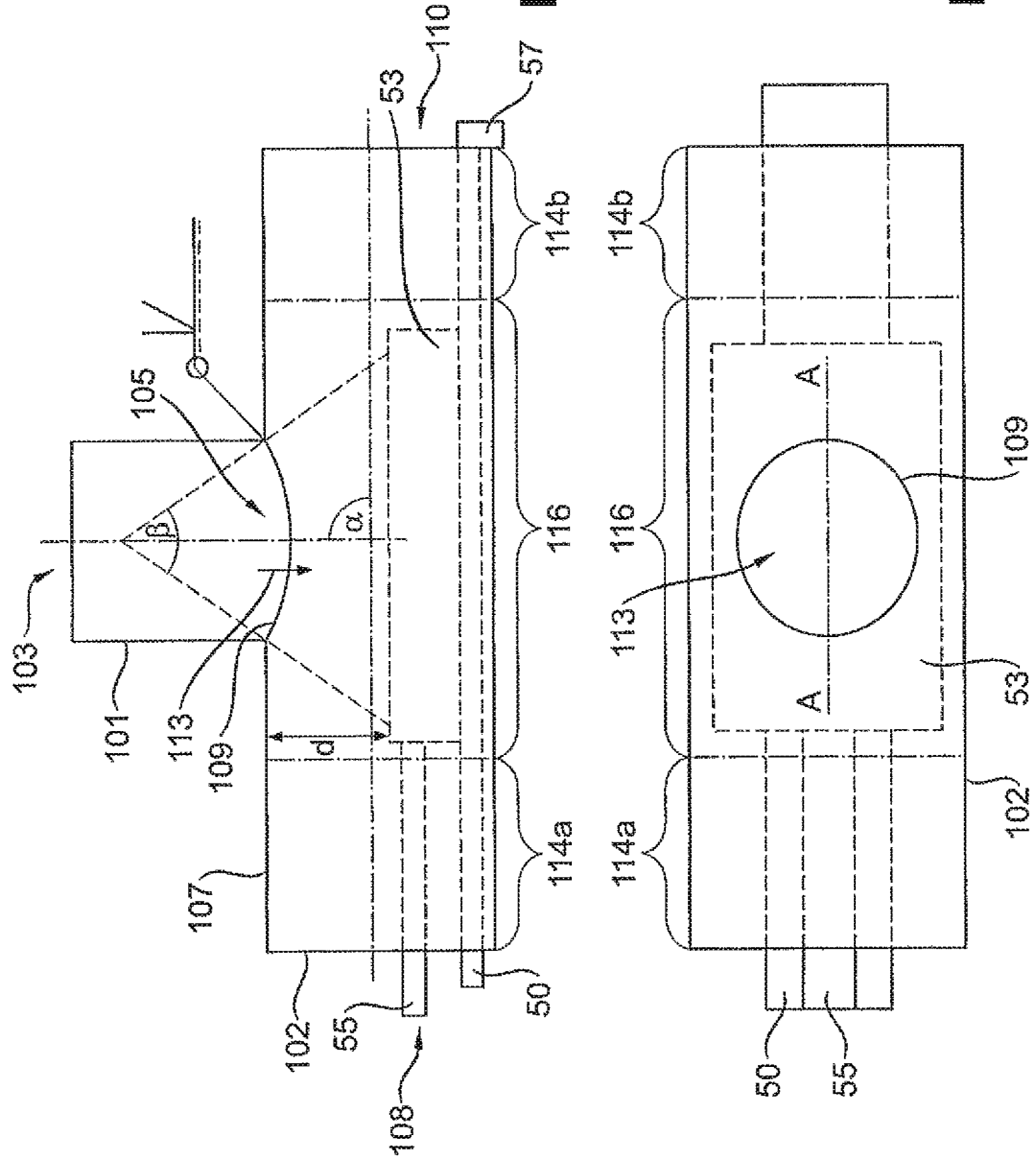

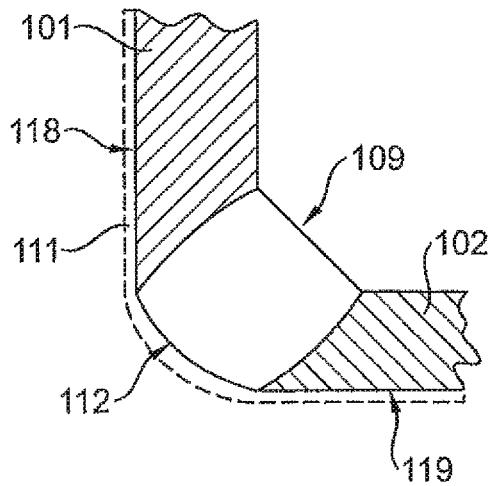
FIG. 6a
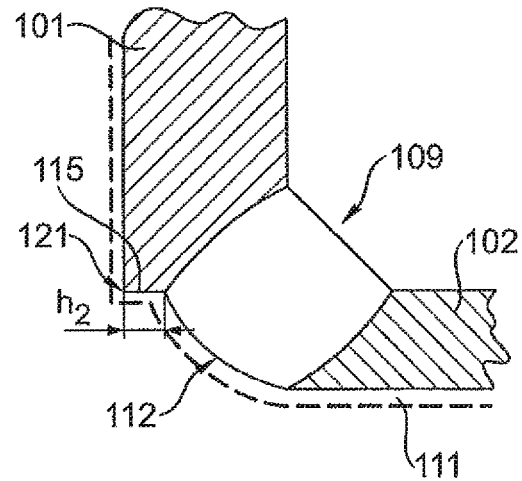
FIG. 6c
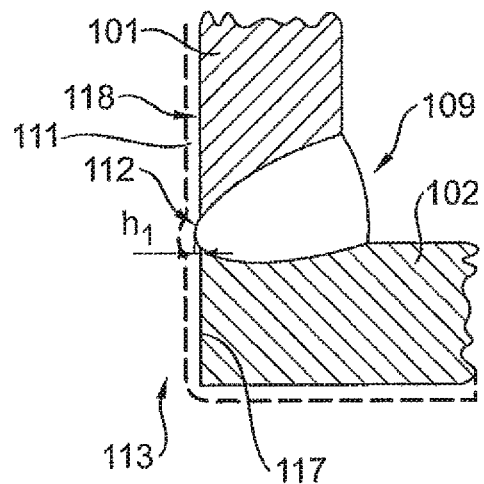
FIG. 6b,d
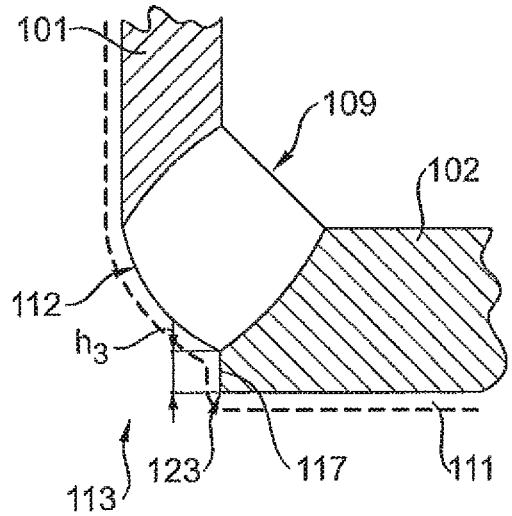
FIG. 6e

METHOD FOR PRODUCING A PIPE ELEMENT, PARTICULARLY A PIPE ELEMENT OF A FIRE-EXTINGUISHING FACILITY, PIPE ELEMENT AND PIPE SYSTEM COMPRISING SAME

PRIORITY CLAIM AND INCORPORATION BY REFERENCE

This application is a 35 U.S.C. § 371 application of International Application No. PCT/EP2019/067106, filed Jun. 27, 2019, which claims the benefit of German Application No. 10 2018 115 506.9 filed Jun. 27, 2018, each of which is incorporated by reference in its entirety.

TECHNICAL FIELD

The invention relates to a method for producing a pipeline element, in particular a pipeline element of a fire extinguishing installation. The invention also relates to such a pipeline element and to a pipeline system having such a pipeline element.

BACKGROUND AND SUMMARY OF THE INVENTION

Methods for producing pipelines for fire extinguishing installations are generally known. Pipeline elements in fire extinguishing installations are subject to the particular challenge that they are installed unused in objects for very long periods of time and, in the event of operation, must assuredly perform their task of transporting fluid.

For example, fire extinguishing installations in which the pipeline systems carry extinguishing liquid even in the standby state, and alternatively those which do not yet carry extinguishing liquid in the sprinkler lines in the standby state, are widely used. In the case of the latter systems in particular, the susceptibility to corrosion inside the pipes is a particular challenge, which is why efforts have been made in the prior art to reduce the corrosion resistance of pipeline elements, in particular for fire extinguishing installations. In order to avoid the problem of corrosion within fire extinguishing installations, alternative approaches have been developed in which large parts of the pipeline system, and with them the majority of the installed pipeline elements, are in the standby state filled not with extinguishing fluid but with gases.

The costs for the systems from the prior art are sometimes considerable, since on the one hand the use of corrosion-resistant pipes or complex passivation processes were necessary, and on the other hand high installation costs were necessary for the charging of the respective pipeline systems with gas.

EP Application 1 2153 964 which published as EP 2 623 163 A1 and EP Application 1 2798 290 which published as EP 2 766 653 each describe systems and methods which achieve a significant improvement over the prior art. Said documents describe for the first time the use of polymer enhancement by autodeposition on the inside of the pipe in pipeline elements of fire extinguishing installations. The polymer enhancement described in said documents is extremely robust owing to the attained ionic bonding of a polymer-based coating material to the pipe surface and allows the use of simple metals that are not yet corrosion-resistant per se, in particular low-alloy steel types. At the same time, very low corrosion development, to the point of complete corrosion resistance, is achieved even over relatively long observation periods.

There is nevertheless a need for further improvement in relation to the prior art. Thus, in relation to the prior art, it is sought for not only simple pipeline elements which are composed only of a tubular hollow body with one inlet and one outlet, but also pipeline elements which have multiple outlets and which are in particular made up of multiple hollow bodies, to be equipped with a polymer enhancement. The assembly of multiple hollow bodies to form complex pipeline elements is performed either by piecing the hollow bodies together using couplings, pipe connectors and the like, or by welding. It has been found that the use of pipe connectors in the region of the transition from one hollow body to the next hollow body leads to an increase in the flow resistance, which lowers the flow speed and increases resulting pressure losses, expressed by the so-called C-factor. This potentially increases the outlay on equipment required to convey the extinguishing fluid, for example in the form of the need for more powerful pumps or larger nominal pipe widths. The C-factor is calculated in accordance with generally known principles using the Hazen-Williams equation.

In the prior art, where first and second hollow bodies were connected to form a pipeline element by welding, this was performed in each case taking into consideration only the requirement of pressure tightness. In previous practice, the connections of the hollow bodies to the pipeline element were thus duly connected to one another in a pressure-tight manner. The long-term corrosion resistance known for example from EP 2 766 653 was nevertheless not reliably established.

Furthermore, weld spatter generally forms during welding, which adversely affects the surface of the pipeline element. In the prior art, it has hitherto been sought to collect the spatter through the use of water baths, but this has been regarded as disadvantageous with respect to the aspects of contamination, the need for drying, disposal and corrosion of the pipeline element.

Accordingly, the invention was based on the object of specifying a method for producing a polymer-enhanced pipeline element which as substantially as possible overcomes the disadvantages described above. In particular, the invention was based on the object of specifying a method of the type described at the outset which, despite the presence of a welded connection, permits better flow characteristics and an improvement in corrosion resistance in the case of complex pipeline elements.

The invention achieves the object on which it was based, in the case of the method described at the outset, by means of the features described according to the invention. In particular, the method comprises the steps:

providing a first hollow body and a second hollow body, positioning the hollow bodies relative to one another in a welding zone such that the connection of the hollow bodies can be performed in the welding zone, positioning a collecting container within the first and/or second hollow body in the region of the welding zone, and welding the first hollow body to the second hollow body in the welding zone such that the pipeline element is obtained, wherein a fully encircling weld seam is generated which has a root extending on the inside of the pipeline element, and collecting, by means of the collecting container, weld spatter that occurs on the inside of the pipeline element during the welding process.

The method according to the invention is advantageously further developed in that the hollow bodies each have at least one edge surface, wherein the edge surfaces of the first and second hollow bodies each have an encircling inner edge, and the welding step comprises: forming the root of the weld seam with a thickness which completely encompasses at least one of the inner edges, and preferably both inner edges.

Basically, the suitability of the inside of the pipeline element after the welding for the subsequent coating is more suitable the greater the proportions of the edge surfaces that have been encompassed by the root, because the root achieves a very reliable closure of any previously existing irregularities on the edge by melting, and at the same time has a smoother surface geometry compared to the edge surface of the hollow bodies. Irregularities are to be understood to mean in particular cracks, crevices, capillaries, etc. in the sub-millimeter range, as well as sharp edges. The more such irregularities can be avoided, the better the coating success that is to be expected. According to the invention, it has been found that a satisfactory coating is already achieved if the root completely encompasses only one of the two edge surfaces of the first or second hollow body and a sub-region, in particular a radially inner sub-region, of the other edge surface is not encompassed. It is particularly preferable for both edge surfaces to be completely encompassed. It has been recognized that, even in the prior art, in the case of subsequent polymer enhancement of the pipeline elements, in particular using an autodeposition method, the edges of the pipeline elements have already been coated. Contrary to the previously established opinion, however, this has not yet been achieved with a satisfactory thickness. A further advantage of the invention is evident here: Through the avoidance of sharp edges in the weld seam region that is achieved as a result of the encompassment by the root, better coating also of any remaining edges is also attained. A sharp edge is to be understood to mean an edge angle of less than 90°.

The invention is based on the recognition that, in the case of the first and second welding bodies being completely welded through in the welding zone such that the root of the weld seam is formed in the desired manner, the risk of weld spatter accumulation on the inside of the hollow bodies or of the pipeline element can arise. The collection of weld spatter in accordance with the invention by means of a collecting container at least substantially eliminates the accumulation of such weld spatter on the inside of the pipe, which leads to a significant increase in the uniformity of the surface of the pipeline element as a whole. A noticeable improvement in the uniformity of the surface is particularly advantageously achieved in the region of the weld seam, even if the weld seam still has a minor influence on the flow resistance. The pipe welded in accordance with the invention is distinguished by the fact that it inherently already has a relatively low flow resistance. Furthermore, the pipe according to the invention is particularly suitable for a downstream surface coating process, for example the application of a polymer-based layer on the inside of the pipeline element.

The avoidance of the accumulation of weld spatter is advantageously manifest not only in the increased surface uniformity but also in the fact that, in unfavorable configurations, weld spatter can become detached from the surface of the pipeline element over time. Even if the weld spatter were successfully coated, it would, after detachment, leave behind an uncoated area. According to the invention, however, that risk is at any rate substantially eliminated. The application of the polymer-based layer will be explained in more detail below in preferred embodiments.

In one advantageous refinement of the invention, the weld seam is generated by means of a welding tool by virtue of the welding tool and/or the hollow bodies being moved relative to one another such that a welding point describes a path along the first or second hollow bodies, and the collecting container is positioned substantially opposite the welding point. This is to be understood to mean that the collecting container does not have to be arranged strictly radially opposite the welding point, but rather has to be oriented toward the welding point such that it can collect the weld spatter that spreads out from the welding point at a scatter angle. The direction of the spreading depends inter alia on the orientation of the welding tool, and taking into consideration the width and length of the collecting container, said container may also be situated laterally adjacent to the radial with respect to the welding point, as long as it covers the scatter cone.

The relative movement can be generated by virtue of the welding tool traveling along a path along the hollow bodies, or by virtue of the hollow bodies being moved, for example rotated, relative to a static welding tool. Combinations of these two forms of movement are also conceivable. Liquid weld metal will, as expected, move away from the inner wall of the hollow bodies from the side of the weld root with a certain scatter angle, and therefore it is advantageous to position the collecting container substantially opposite the welding point from which the weld spatter spreads out.

In a preferred embodiment, the collecting container is introduced, proceeding from a face end of the first or second hollow body, within the respective hollow body into the welding zone. Preferably, the collecting container is moved by means of a lance with a spacing to the wall of the respective hollow body. In preferred embodiments, the lance may for example be motor-driven or moved manually. The spacing of the collecting container from the wall of the hollow bodies or of the pipeline element prevents scratches and other surface damage from being introduced into the wall of the hollow bodies, which in turn results in better coatability and surface quality.

The collecting container is preferably mounted so as to be rotatable relative to the first and/or second hollow body about the longitudinal axis of the first and/or second hollow body. This makes it possible for the collecting container to be moved in unison with the welding point moving in an encircling manner along the hollow body, and for weld spatter that occurs to be collected in every position of the welding tool. This is advantageous in particular if hollow bodies with the same or approximately the same nominal widths are to be welded to one another. Approximately equal nominal widths are to be understood to mean nominal width deviations in the range of up to 2 mm.

In a further preferred embodiment, before the introduction of the collecting container, a guide rail is introduced into the one or more hollow bodies. In the introduced state, the guide rail particularly preferably lies against the wall of the respective hollow body. The collecting container can then be displaced along the guide rail by means of the lance. This makes the movement of the collecting container itself easier to control and allows the use of a lance of lighter weight, since the collecting container does not have to be supported over the entire length of the lance. Furthermore, the guide rail enables the collecting container to be introduced into hollow bodies of any length.

The rail is preferably introduced into the pipe in a contact-free manner and then laid down such that grinding of the rails along the inner wall of the pipeline element is prevented.

In a further preferred embodiment, the collecting container has a length in its introduction direction which corresponds at least to the diameter of that hollow body into which the collecting container is introduced and which preferably corresponds, in a range from 1.5-3 times, to the largest diameter of that hollow body into which the collecting container is introduced. If the hollow bodies to be welded are of tubular form, preferably of hollow cylindrical form, they have a substantially constant diameter in the interior. If the hollow bodies are not of completely cylindrical form, for example owing to the fact that they are locally flattened or are altogether oval in shape, or possibly also polygonal in shape, use is made, as comparison variable, of the diameter of that in a transverse direction through the hollow body which assumes the largest value.

In a further preferred embodiment, the collecting container has a width transversely with respect to its introduction direction which corresponds at least to 0.3 times the diameter of that hollow body into which the collecting container is introduced and which preferably corresponds, in a range from 0.5-1.0 times, to the diameter of that hollow body into which the collecting container is introduced.

Basically, the required width of the collecting container transversely with respect to its introduction direction which still leads to complete or at least substantial collection of all weld spatter in the pipe interior, and the maximum width that the collecting container can assume without jamming against or scratching the pipe wall, depends on the spacing with which the collecting container is to be positioned from the welding point in the welding zone. This is to be understood in particular to mean the spacing of that end of the collecting container which faces toward the welding point, as it were the "upper edge" thereof, to the welding point in a radial direction in relation to the longitudinal axis of the hollow body into which the collecting container has been introduced. The closer the collecting container is positioned to the welding point, the smaller the width of the collecting container can be. In the case of relatively large spacings, the necessary width is correspondingly greater owing to the scattering of the weld spatter.

In a further preferred embodiment, the collecting container has a width transversely with respect to its introduction direction, and in the introduced state in the welding zone assumes a spacing to the welding point, wherein the ratio of the width to the spacing lies in a range of 0.5 or higher, preferably in a range from 1 to 4, particularly preferably in a range from 1.5 to 3.5. This preferably covers a scatter cone of the weld spatter in a range of up to 90°, measured around the axis of the welding tool.

In a further preferred embodiment, the first and second hollow bodies each have a wall, and the wall has in each case an encircling edge surface, wherein the method comprises:

aligning the encircling edge surface of the first hollow body and the encircling edge surface of the second hollow body with one another, and generating the weld seam along the encircling edge surfaces. The alignment of the edge surfaces with one another is to be understood to mean that the edge surface of the first hollow body and the edge surface of the second hollow body are oriented and spaced apart relative to one another in such a way that the two hollow bodies can be welded to one another along the edge surfaces.

In a preferred embodiment of the method, the root of the weld seam completely encompasses the encircling inner edge of one of the hollow bodies, and the remaining inner edge of the other hollow body is spaced apart from the weld seam by a predetermined maximum value in a radial direction.

Preferably, if identical wall thicknesses are present, the predetermined maximum value is less than or equal to half of a wall thickness of the hollow bodies, particularly preferably less than or equal to one quarter of the wall thickness of the hollow bodies. Alternatively, if different wall thicknesses are present, the maximum value is preferably less than or equal to a difference between the wall thicknesses of the hollow bodies, particularly preferably less than or equal to half of the difference between the wall thicknesses of the hollow bodies.

In a further preferred embodiment of the method, in which the welding step comprises: forming the root of the weld seam with a thickness which completely encompasses the inner edges of both hollow bodies, the welding is performed such that the root of the weld seam protrudes radially inward from an inside of the wall of the first and/or second hollow body by a predetermined maximum value, wherein the predetermined maximum value preferably amounts to 0.7 times the wall thickness of the hollow bodies or less. By means of the thus ensured but only slight protrusion of the weld seam into the interior of the pipeline element, it can be easily ensured that both edge surfaces have actually been completely encompassed and no cavities or the like remain in the region of the inner edges of the hollow bodies after the welding process. By limiting the maximum height by which the weld seam protrudes inward, it is ensured that the weld seam does not generate any undesired increased flow resistance, which would reduce the C-factor, that is to say the long-term corrosion resistance of the pipeline element.

The generated edge surface preferably corresponds to the contour of the respective other hollow body to which the hollow body is to be welded by way of its edge surface. The contour of the edge surface to be generated is preferably determined in advance by measurement, and then the edge surface is generated in a manner dependent on the previously determined contour.

The encircling edge surface of the first hollow body is preferably formed on a face end of the hollow body. More preferably, the encircling edge surface of the second hollow body is spaced apart from the face ends of the second body and defines a cutout through the wall of the second hollow body.

In a further preferred embodiment, the encircling edge surface of the first hollow body is formed on a face end of the hollow body. More preferably, the encircling edge surface of the second hollow body is spaced apart from the face ends of the first hollow body and defines a cutout through the wall of the second hollow body. This embodiment is present in particular if the first hollow body constitutes a so-called connection element and the second hollow body constitutes a so-called base pipe from which one or more connection elements extend away laterally. In the example of fire extinguishing installations, it is for example the case that extinguishing nozzles or sprinklers are connected to these connection elements. A spacing of the edge surface to the face ends of the second hollow body gives rise to a connection of the first and second hollow bodies in the manner of a T-pattern. Preferably, the hollow bodies each have a longitudinal axis, and the longitudinal axes of the hollow bodies are arranged perpendicular to one another or at an angle of +/−5° with respect to the perpendicular. More preferably, the longitudinal axis of the first hollow body is aligned coaxially with respect to a central axis of the cutout.

The spacing between the cutout in the second hollow body and the closest face end preferably lies in a range from 20 cm to 2 m.

As an alternative to the arrangement described above, in a further preferred embodiment the encircling edge surface of the second hollow body is (likewise) formed on a face end of the second hollow body. In this embodiment, it is thus the case that a first and a second hollow body are connected to one another at their respective face ends by welding. This embodiment is particularly preferably to be used if the first and the second hollow body have substantially the same nominal diameter and if elongated base pipe elements are to be generated by welding of the first and second hollow body to one another.

In a further preferred embodiment, the method furthermore comprises the step: generating at least one of the encircling edge surfaces of the first and/or second hollow body by means of cutting, preferably by means of plasma cutting. Plasma cutting has proven to be a highly efficient means of generating the edge surfaces on the hollow bodies, in particular for wall thicknesses of 3.0 mm and above. Precise cuts are possible at high speed and thus with high economic efficiency. Plasma cutting is also suitable for automation of the manufacturing process. In particular, a collecting container according to one of the preferred embodiments described above and below is also used in the case of plasma cutting. With regard to the formation of spatter during the plasma cutting, and the effects and avoidance thereof, the statements made elsewhere regarding weld spatter apply analogously.

The generated edge surface preferably corresponds to the contour of the respective other hollow body to which the hollow body is to be welded by way of its edge surface. The contour of the edge surface to be generated is preferably determined in advance by measurement, and then the edge surface is generated in a manner dependent on the previously determined contour.

The step of positioning the collecting container is preferably performed before the step of edge generation, and the method furthermore comprises:

collecting, by means of the collecting container, cut-out material that arises during the generation of at least one of the encircling edge surfaces of the first and/or second hollow body. The cut-out material can be collected by means of the collecting container without any additional work step. The collecting container may remain in its position after collecting the cut-out material, provided that the generation of the weld seam is performed at the same workstation, or may optionally also be removed, for example by means of a manually or robotically guided magnet, mechanical gripper or the like.

The generation of the weld seam and the generation of the edge surfaces is possible, for example, using one or more single-jointed or multi-jointed mobile robot arms. The cutting tool and the welding tool required for this may for example be used as interchangeable heads on the same robot.

In a further preferred embodiment, the method furthermore comprises the step: cleaning at least one of the encircling edge surfaces, preferably all of the encircling edge surfaces, before the welding, preferably after the cutting, in particular plasma cutting, and before the welding. The cleaning of the edge surfaces comprises in particular the removal of burrs and loose particles, but also of dirt. If the upstream cutting of the edge surfaces was performed by plasma cutting, a metal oxide layer has sometimes formed in the region of the edge surface as a result. It has been recognized in the context of the invention that the cleaning of the edge surface and in particular the removal of metal oxides from the surface of the hollow bodies in the region of the edge surfaces leads to a much more uniform weld pattern and results in a more uniform shape of the root of the weld seam in the interior of the pipeline element. A further advantage of this embodiment is that, firstly, the cleaning of the edge surfaces can be automated with little outlay, in particular if it is performed using a rotationally driven brush. Secondly, the cleaning of the edge surfaces per se also allows an automated welding process, since this is much easier to control in view of the cleaned edge surfaces that have been freed of metal oxides.

In summary, the step of cleaning thus preferably comprises, according to the invention, the removal of metal oxides and loose particles from the at least one encircling edge surface, particularly preferably from all of the edge surfaces, preferably by means of brushes.

In a further preferred embodiment, the method according to the invention furthermore comprises the step: flattening the wall of the first and/or second hollow body in the region in which, in each case, the encircling edge surface extends or is to be generated, preferably before the welding step and more preferably before the cutting step. The flattening may be generated by externally applying a deformation force to the wall of the respective hollow body, for example pneumatically, hydraulically or otherwise mechanically. Optionally, on the underside of the pipeline element, a counterpart half shell of the size of the respective region to be correspondingly flattened can be placed as a counterholder against the hollow body from the outside in order to prevent deformation of the pipeline element at undesired locations, that is to say not at the point where the flattening is to take place. The advantage of the flattening is that the tool for generating the weld seam can perform a substantially flat circular movement and does not have to be guided along a three-dimensional curvature. In this way, on the one hand, the process parameters in the guidance of the welding tool are easier to control, and secondly, the course of the molten metal is easier to control. Since the edge surface runs in a substantially planar manner in the region of the flattening, the edge surface of the corresponding hollow body, which is formed on a face end, can likewise lie in a plane, which in turn simplifies the cutting of the edge surface on the respective hollow body. The flattening is preferably carried out with a predetermined indentation depth, wherein, in preferred embodiments, the depth lies in a range from 0.05 times to 0.18 times the nominal width of the flattened hollow body.

In a further preferred embodiment, the method of the preferred embodiments described above is a method for producing a polymer-enhanced pipeline element of a fire extinguishing installation, and furthermore comprises:

applying a polymer-based layer to the inside of the pipeline element, wherein the polymer-based layer completely covers the inside of the pipe element and the root of the weld seam.

The application of the polymer-based layer is performed in the method according to the invention preferably by dipping of the pipeline element into a dip bath which contains a corresponding coating material. The advantage of a dip coating process is that, in addition to the coating of the particularly sensitive interior region of the pipeline elements, the outer surface is also at least substantially coated in the same coating process.

In a further preferred embodiment, the hollow bodies are formed from a metal suitable for chemical autodeposition, in particular from a ferrous and/or zinc-containing metal, and the step of applying the polymer layer to the inside of the pipeline element comprises: coating, in particular by means of chemical autodeposition, preferably by dipping of the pipeline element into a dip bath which contains a polymer-based chemical autodeposition material. One advantage of using an autodeposition method is inter alia that a uniform, highly corrosion-resistant coating with simultaneously small layer thicknesses is achieved. In particular with the use of a dipping process, a coating can form wherever the pipeline element is wetted. The advantage according to the invention of the optimized weld seams comes to bear again here, because cavities and the like are substantially avoided as a result of the complete, uniform formation of the weld seam in the preferred embodiments described above. A further advantage can be seen in the fact that, owing to the autodeposition layer and the corrosion protection arising therefrom, thinner pipe wall thicknesses are possible that have previously been ruled out owing to the risk of rusting through. Smaller wall thicknesses, in turn, have the advantage that the surface sections occupied by the weld seams in the pipe interior can be further minimized, and that altogether less material has to be applied by welding.

The autodeposition material preferably comprises polymer constituents which are ionically bonded to the wall of the hollow bodies and to the root of the weld seam, and is preferably present as an aqueous emulsion or dispersion.

The autodeposition material is preferably acidic in its liquid phase, and particularly preferably has a pH in a range from 1 to 5, and particularly preferably a starter material in the form of metal halides. In particular iron halides, particularly preferably iron(III) fluoride, are proposed as metal halides for ferrous metals. The metal halides, by reacting on the surface of the pipeline elements, release metal ions, in the case of a ferrous pipeline element that is to say in particular iron ions, in particular $Fe^{2+}$ ions, which destabilize the polymer constituents in the autodeposition material, resulting in an accumulation on the metal surface of the weld seam and of the hollow bodies.

The autodeposition material preferably has, as polymer constituent, autodepositionable polymers preferably selected from the list comprising:
  i) epoxides,
  ii) acrylates,
  iii) styrene acrylates,
  iv) epoxy acrylates,
  v) isocyanates, especially urethanes, such as polyurethanes,
  vi) polymers with a vinyl group, for example polyvinylidene chloride, or iv) a combination of two or more of i), ii) or iii), which are preferably crosslinked to one another, more preferably via an isocyanate, particularly preferably via a urethane.

In the method according to the invention, the dipping step is continued in one or more dipping processes until such time as the polymer-based layer applied to the inside of the pipeline element has a thickness in a range from 7 μm to 80 μm, preferably a thickness in a range from 7 μm to 30 μm. The above-stated values relate to the dry layer thickness and in particular the increase in pipe thickness relative to the uncoated state. It has been found that even layer thicknesses in a range from 7 μm can be applied with the method according to the invention in such a way that complete coverage of the inner surface of the pipeline element and also of a major part of the outer surface, if correspondingly dipped, is realized.

The invention has been described here in a first aspect with reference to the method according to the invention. In a further aspect, the invention also relates to a pipeline element, in particular a pipeline element produced in a method according to one of the preferred embodiments described above.

The pipeline element achieves the underlying object stated in the introduction in that it has: a first hollow body, a second hollow body, wherein the hollow bodies are aligned with one another, and the first and second hollow bodies are connected by means of an encircling weld seam, wherein the pipeline element has, on the inside, a first wall region in which the weld seam has an encircling root extending on the inside of the pipeline element, wherein the first wall region extends along the circumference of the pipeline element and to both sides of the weld seam over a predetermined length in a longitudinal direction of the pipeline element, the pipeline element has, on the inside, a second wall region which is arranged adjacent to the first wall region, and the pipeline element has a surface structure that is uniform in the first wall region and in the second wall region. A uniform surface structure is present if the number of surface irregularities, in particular in the form of weld spatter, lies in a range of 0.2 per $cm^2$ or less. Surface irregularities are to be understood in particular to mean elevations of 0.3 mm or more protruding from the surface.

With regard to the pipeline element, the invention adopts the same advantages and preferred embodiments as for the method according to the invention of the preferred embodiments described above. To avoid repetition, reference is made to the statements above.

Providing the pipeline element with a surface structure that is uniform in the first and second wall regions increases the suitability of the pipeline element for being coated on the inside with very thin protective layers. The uniformity of the surface structure is particularly preferably defined in terms of the surface roughness in the first and second wall regions, in each case averaged over the entire wall region with the exception of the root of the weld seam, wherein the surface roughness in the first region and the surface roughness in the second region are equal, or the surface roughness in the first wall region is no more than 15% above the surface roughness in the second wall region, or no more than 15% below the surface roughness in the second wall region. Preferably, said deviation lies in a range of 10% or less, particularly preferably in a range of 5% or less. The surface roughness is preferably defined in terms of the mean roughness value Ra and/or the mean roughness depth Rz, wherein the mean roughness value Ra is a mean value of all absolute deviations of the roughness profile from a mean line of a predetermined measurement section, and the mean roughness depth Rz is the mean value of the individual roughness depths from five successive individual measurement sections in the roughness profile, wherein the distances between the extreme values of each measurement section are added and averaged over the number of measurement sections. Particularly preferably in the first wall region and in the second wall region in a range a mean roughness value Ra<8 μm and a roughness depth Rz<40 μm.

The wall of the pipeline element in the first wall region is particularly preferably free from weld spatter.

In a preferred embodiment, the pipeline element has a polymer-based layer on the inside of the pipeline element, wherein the polymer-based layer completely covers the inside of the pipe element and the root of the weld seam. The above-described requirements for the surface structure apply equally to an inside of the pipe element with a polymer-based layer and to the uncoated pipeline element. The pipeline element preferably also at least substantially has such a polymer-based layer on its outside.

In a preferred refinement of the pipeline element, the root of the weld seam completely encompasses an edge surface of one of the hollow bodies, and the pipeline element has, in the interior, a remaining inner edge of the other hollow body, which remaining inner edge is spaced apart from the weld seam by a predetermined maximum value in a radial direction.

Preferably, if identical wall thicknesses are present, the predetermined maximum value is less than or equal to half of a wall thickness of the hollow bodies, particularly preferably less than or equal to one quarter of the wall thickness of the hollow bodies. Alternatively, if different wall thicknesses are present, the maximum value is preferably less than or equal to a difference between the wall thicknesses of the hollow bodies, particularly preferably less than or equal to half of the wall thicknesses of the hollow bodies. In a preferred embodiment, the root of the weld seam completely encompasses the edge surfaces of both hollow bodies, and protrudes radially inward from an inside of the first and/or second hollow body by a predetermined maximum value, wherein the predetermined maximum value preferably amounts to 0.7 times the wall thickness of the hollow bodies or less. In a further preferred embodiment, the wall of the first hollow body is welded at one of its face ends to a region of the wall of the second hollow body, which region is spaced apart from the face ends of the second hollow body and in which region a cutout extends through the wall. Such an arrangement of the first and second hollow bodies is also referred to as a T-arrangement. Such an arrangement is preferred in particular if the pipeline element has a connection element as the first hollow body and a main or base pipe as the second hollow body, from which one or more connection elements extend away laterally. The connection elements will be specified in more detail further below. Preferably, the hollow bodies each have a longitudinal axis, and the longitudinal axes of the hollow bodies are arranged perpendicular to one another or at an angle of +/−5° with respect to the perpendicular. More preferably, the longitudinal axis of the first hollow body is aligned coaxially with respect to a central axis of the cutout.

The spacing between the cutout in the second hollow body and the closest face end preferably lies in a range from 20 cm to 2 m.

In an alternative preferred embodiment, the walls of the first and of the second hollow body are welded to one another in each case at a face end of the respective hollow body. In this embodiment, the hollow bodies are thus welded to one another in each case at an end side, for example in order to generate a pipeline element with a particular length that exceeds the size of the respective hollow bodies. The welding of the hollow bodies in the manner according to the invention is, in this embodiment, particularly preferred for those embodiments in which the first and second hollow bodies have identical or almost identical nominal diameters. Here, nominal diameter deviations in the range of up to 10% can generally be tolerated.

In a further preferred embodiment, the wall of the second hollow body is flattened in a region around the cutout. In other words, the second hollow body is flattened in that wall region in which the first hollow body is also to be attached. This has the advantage that the corresponding edge surface of the first hollow body can be made substantially planar and does not need to have a three-dimensional curvature with which the first hollow body would otherwise have to lie closely against the wall, because the wall is likewise substantially planar in the region of the flattenings.

In a further preferred embodiment, the hollow bodies are formed from a metal suitable for chemical autodeposition, in particular from a ferrous and/or zinc-containing metal, and the polymer-based layer contains a metallic constituent, preferably in the form of metal ions, that is to say particularly preferably in the form of iron ions in the case of a ferrous metal and in the form of zinc ions in the case of a zinc-containing metal.

The autodeposition material preferably has, as polymer constituent, autodepositionable polymers preferably selected from the list comprising:
  i) epoxides,
  ii) acrylates,
  iii) styrene acrylates,
  iv) epoxy acrylates,
  v) isocyanates, especially urethanes, such as polyurethanes,
  vi) polymers with a vinyl group, for example polyvinylidene chloride, or
  iv) a combination of two or more of i), ii) or iii),
which are preferably crosslinked to one another, more preferably via an isocyanate, particularly preferably via a urethane. In a further preferred embodiment, the polymer-based layer has a thickness in a range from 7 µm to 80 µm, particularly preferably a thickness in a range from 7 µm to 30 µm. This in turn relates to the dry layer thickness and in particular to an increase in thickness relative to the uncoated state.

Preferably, the second hollow body is of tubular form and has a nominal diameter in a range from DN 15 to DN 300, preferably in a range from DN 32 to DN 80.

Alternatively, the nominal width ranges in the inch system lie from ½" (NPS) to 12" (NPS), particularly preferably in a range from 1 ¼" (NPS) to 3" (NPS).

Preferably, the second hollow body has a longitudinal axis and a pipe length in the direction of the longitudinal axis in a range of 1 m or more, more preferably in a range of 3 m or more, particularly preferably in a range of 5 m or more.

It is furthermore preferable if the first hollow body is likewise of tubular form and has a nominal diameter which is equal to the nominal diameter of the second hollow body or less than the nominal diameter of the second hollow body.

The first hollow body is preferably selected from the list comprising:
  pipe,
  connector,
  flange,
  closure cap,
  reduction piece,
  bend, or nipple.

Preferably, on the first hollow body, there is formed a fastening element, preferably selected from the list comprising:
  thread;
  groove; or
  flange ring.

The fastening element is preferably configured for connecting fluid discharge devices, such as extinguishing nozzles, sprinklers, fluid distributors or other pipeline elements, to the first hollow body. The fastening element is preferably formed at least partially from one of the above-mentioned metals suitable for chemical autodeposition, in particular a ferrous and/or zinc-containing metal, and at least partially provided with the polymer-based layer.

The invention has been described above with reference to a pipeline element and a production method for the pipeline element. In a further aspect, the invention also relates to a pipeline system of a fire extinguishing installation, having a number of pipeline elements which are coupled to one another, wherein one, multiple or all pipeline elements have been designed or produced in accordance with one of the preferred embodiments described above. The preferred embodiments and advantages according to the invention of the production method and of the pipeline element according to the invention are at the same time the advantages and preferred embodiments of the pipeline system according to the invention, for which reason reference is made in this regard to the present statements in order to avoid repetition.

It is particularly preferable if one, multiple or all of the pipeline elements has a first hollow body of tubular form and a second hollow body of tubular form, wherein the nominal diameter of the first hollow body is equal to or less than the nominal diameter of the second hollow body, and wherein, in each case, a sprinkler, an extinguishing nozzle, a fluid distributor or a further pipeline element is connected to that face side of the first hollow body which is averted from the weld seam between the two hollow bodies.

The invention furthermore also relates to the use of a pipeline element in a pipeline system of a fire extinguishing installation, in which a number of pipeline elements are coupled to one another, wherein in each case one, multiple or all pipeline elements is or are designed in accordance with one of the preferred embodiments described above.

BRIEF DESCRIPTION OF THE DRAWINGS

The invention will be described in more detail below with reference to the accompanying figures and with reference to preferred exemplary embodiments.

FIG. 3 is a schematic three-dimensional illustration of a pipeline element produced in accordance with the method according to the invention.

FIGS. 4*a, b* show side views of the pipeline element as per FIG. 3.

FIGS. 5*a-e* and FIGS. 6*a-e* are detail illustrations of various preferred variants of the pipeline element as per FIGS. 3 and 4*a, b*.

MODE(S) FOR CARRYING OUT THE INVENTION

Figure 1:
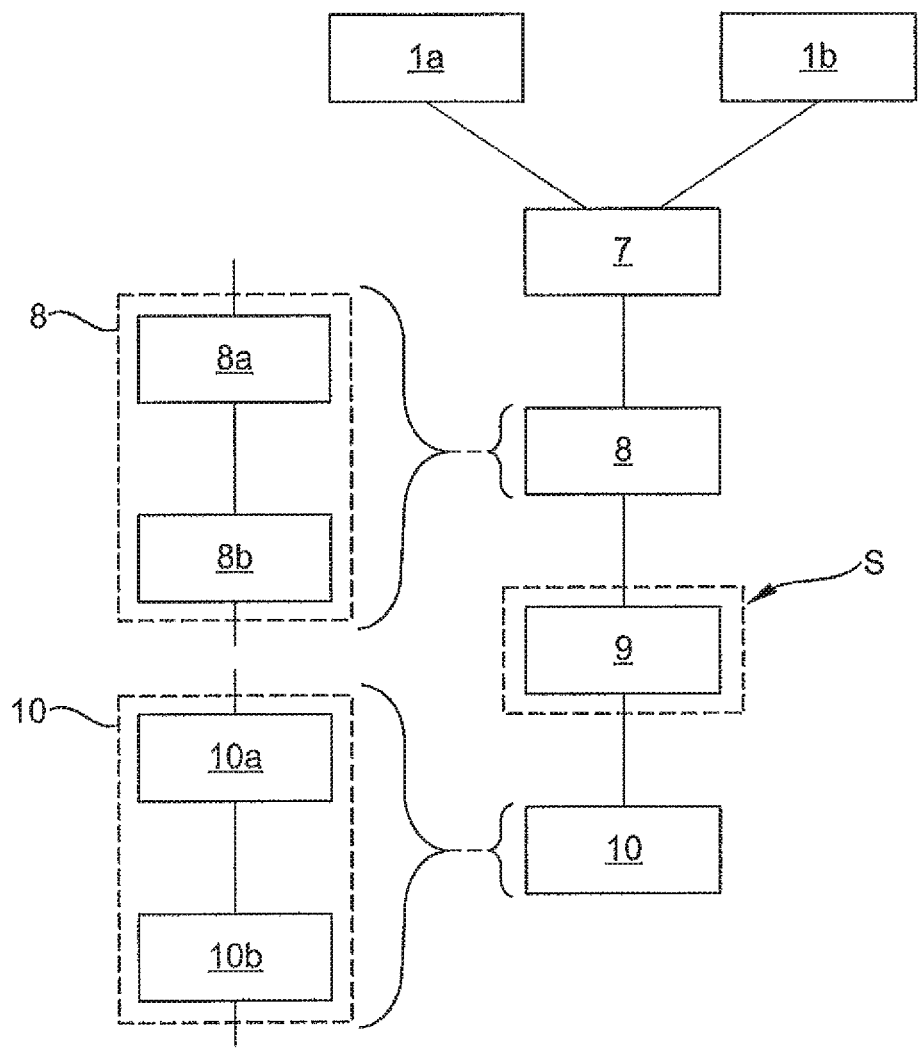
FIG. 1 shows a schematic method flow diagram of the method according to the invention according to a preferred exemplary embodiment.

FIG. 1 illustrates the schematic sequence of the method according to the invention for producing a polymer-enhanced pipeline element according to a preferred exemplary embodiment. Firstly, in steps 1*a*, 1*b*, a first hollow body and a second hollow body are provided.

In a next method step 7, the first hollow body and the second hollow body are aligned with one another such that in each case one edge surface of one hollow body is aligned and arranged as closely adjacent as possible to a corresponding edge surface of the respective other hollow body. The alignment of the hollow bodies with respect to one another may be performed manually or by means of single-jointed or multi-jointed robots.

After the hollow bodies have been aligned with respect to one another, a collecting container is introduced into at least one of the two hollow bodies in a method step 8, cf. FIG. 3. The collecting container is arranged such that, in a subsequent method step 9, in which welding is performed, said collecting container is arranged in a welding zone S and collects any weld spatter that spreads from the weld seam and its root in the interior of the one or more hollow bodies, cf. FIG. 3.

The method step 8 preferably comprises, as a first sub-step 8*a*, the introduction of a guide rail into the one or more hollow bodies and, as a second sub-step 8*b*, the guided introduction of the collecting container into the respective hollow body, for example by means of a lance. In addition to the guiding function, the guide rail preferably also has the function of defining a spacing between the collecting container, on the one hand, and the point at which the weld seam is to be generated, on the other hand. The closer the collecting container can be arranged to the welding point, the better the collection of weld spatter and the smaller the collecting container can be.

In a next method step 9, the previously aligned hollow bodies are welded to one another in the welding zone S along the mutually aligned encircling edge surfaces, such that a fully encircling weld seam is generated which has a root extending on the inside of the pipeline element. A single-layer weld seam is preferably applied.

Following the welding, the collecting container (step 10*a*) and, if used, the guide rail (step 10*b*), are removed again from the hollow bodies or the hollow body.

The interior of the hollow bodies is then preferably free from weld spatter.

The pipeline element generated from the hollow bodies as per FIG. 1 can subsequently be supplied for polymer enhancement. This is shown by way of example in FIG. 2. In addition to the stages of the method already illustrated in FIG. 1, the following steps also take place here.

Following step 1*a, b*, in a next method step 3*a, b*, edge surfaces are firstly provided on the hollow bodies, preferably by means of plasma cutting. In steps 3*a, b*, the hollow bodies are provided with edge surfaces either on one or both of their end faces or on a wall section which is spaced apart from the respective end faces, said wall section being in the form of a cutout. In a preferred variant of the method, step 8 (or 8*a*, 8*b*) is performed already before the edge generation step, such that the collecting container can simultaneously also perform the collection of the cutting waste.

In a method step 5*a, b* that follows the edge generation, the first and second hollow bodies are cleaned on the edge surfaces, preferably by means of a rotationally driven brush. If plasma cutting was used in the previous step to generate the edge surfaces, metal oxides and loose particles and burrs formed as a result of the brushing are removed as substantially as possible.

After the welding, the welded-together hollow bodies as a pipeline element are, in a method step 21 which may in turn have several sub-steps not illustrated in detail, prepared for the subsequent coating. The preparation comprises the cleaning of the welded-together hollow bodies in one or more dip baths in which, for example, pickling or rinsing media such as demineralized water can be stored. The exact number and arrangement of the preparatory steps depends on the specifications of the coating material to be used.

The welded hollow bodies prepared in step 21 are then chemically coated in a next method step 23 in one or more dipping operations by means of an autodeposition method. The result of the dipping is that the entire inside including the weld seam, but also the outside of the hollow bodies, is substantially completely coated.

Following the coating of the hollow bodies and of the weld seam with the polymer-based layer, a thermal aftertreatment process takes place in a step 25. The step 25 may include one or more substeps, in each of which a flash-off or tempering with predetermined temperatures and tempering periods is performed (low-temperature tempering or high-temperature tempering). Optionally, the pipeline elements coated and aftertreated in this way, which have been generated from the hollow bodies, may be powder-coated in a step 27. The powder coating is also preferably cured in a thermal aftertreatment process in step 25.

Subsequently, in step 29, the pipeline element is conveyed out of the production process and is ready for use.

The method step 25 for the thermal aftertreatment of the pipeline elements is shown as a single step for the sake of simplicity. It is however possible for multiple successive heat treatment stages to be performed in step 25, which are performed in one or in multiple different devices.

The welding process according to step 9 may for example be optimized in that, in a measuring step 13, which may be performed at any time between steps 1a, b and the welding step 9, the diameters of the hollow bodies and the wall thicknesses of the hollow bodies, in particular in the region of the edge surfaces, are measured. Optionally, a measurement is carried out online, for example optically by means of gap detection, directly in the method step of the edge surface generation, and, on the basis of the measured variables, the welding parameters are then adapted online in order to compensate for any deviations of the measured geometry from the starting geometry for which the original welding parameters were stored. This makes it possible for the effects of the deviations, for example any out-of-roundness of the hollow body, to be compensated in the welding process itself.

Depending on the measured parameters, a parameter set for optimal application of the weld seam is then preferably selected in a method step 15 from a predefined value table. The parameters that are stored in the predefined value table for each diameter and each wall thickness preferably comprise the feed rate, the path of the welding tool, the selection of a welding filler material and, in the case of arc welding, the voltage to be applied, the feed rate of the welding wire, etc.

In a subsequent step 17, the previously determined parameters are preferably read into the welding tool or, if welding is to be performed manually, provided to the operator in order that the welding of the first and second hollow bodies to one another can be performed in the subsequent step 19.

Figure 2:
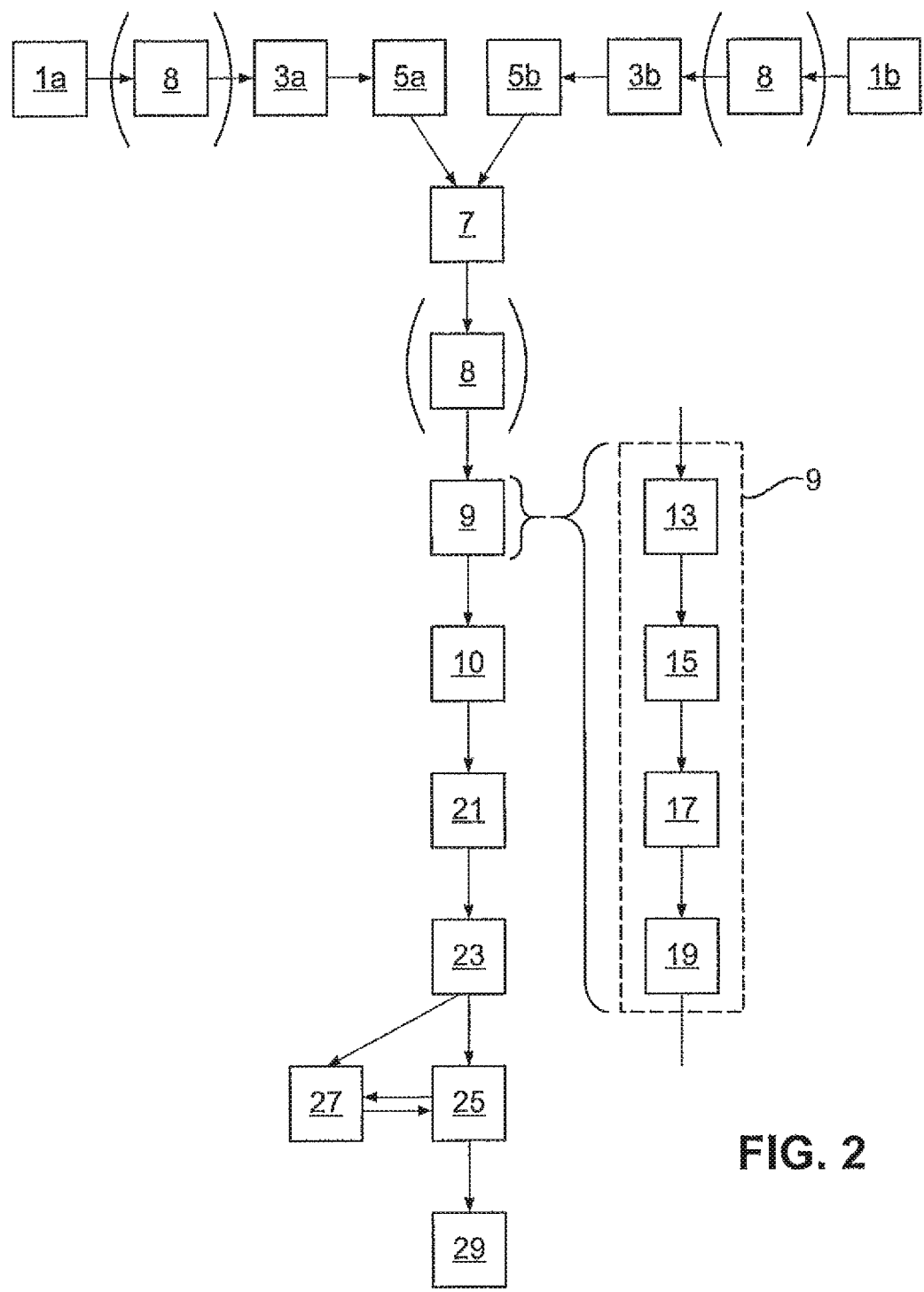
FIG. 2 shows a schematic method flow diagram of the method as per FIG. 1, embedded into a method for producing a polymer-enhanced pipeline element.

The method has been discussed schematically with reference to FIGS. 1 and 2. The pipeline element generated by means of the method, to which reference has in part already been made, will be discussed in more detail in FIGS. 3 to 6a-e on the basis of several variants.

FIG. 3 firstly shows a pipeline element 100 which has a first hollow body 101 and a second hollow body 102.

The first hollow body 101 has a first face end 103 and a second face end 105, at which it is welded to the second hollow body 102. At the point at which it is welded to the first hollow body 101, the second hollow body 102 has a cutout in its side wall 107.

The first hollow body 101 and the second hollow body 102 are connected by means of a single-layer, fully encircling weld seam 109.

In order to arrive at the pipeline element 100 shown in FIG. 3 without the risk of a non-uniform surface structure on the inside of the pipeline element 100, the following measures are preferably taken: Before the welding process, a guide rail 50 is optionally introduced into the hollow body 102 in the direction of the longitudinal axis A of the second hollow body 102. The guide rail 50 serves as a guide means for a collecting container 51, which is likewise introduced into the second hollow body 102 following the introduction of the guide rail 50. The collecting container 51 has a main body 53 for collecting the weld spatter, which, as indicated in FIG. 3, may be of bowl-like or pot-like shape. Alternatively, the main body 53 may however also be in the form of a flat plate or a V-shaped angled surface element. Alternatively, work is carried out without a guide rail, and the collecting container 51 is introduced on its own. The illustrations as per FIG. 3 and FIGS. 4a-b otherwise apply correspondingly.

The collecting container 51 is preferably guided along the guide rail 50 by means of a lance 55, introduced into the second hollow body 102, and positioned in the region of the weld seam 109 to be generated, that is to say in the welding zone S, such that the main body 53, with its width b and its length l, can catch any weld spatter that arises during the welding of the weld seam 109. Here, the guide rail 50 is preferably dimensioned in a manner adapted to the main body 53 of the collecting container 51 such that the collecting container is moved as close as possible to the weld seam 109 to be generated without touching or scratching the interior of the pipeline.

Details regarding the positioning of the collecting container 51 also emerge from FIGS. 4a, b.

If, proceeding from the state as per FIG. 3, the pipeline element 100 is subjected to a polymer enhancement such as the method as per FIG. 2, a polymer-based layer 111 is formed in the method on the inside of the pipeline element and, in the case of a complete dipping process, on the outside of the pipeline element 100, which polymer-based layer extends all the way along the insides of the hollow bodies 101, 102 and also completely covers the encircling weld seam 109 and in particular the root of the weld seam.

In the exemplary embodiment shown, the first hollow body 101 is arranged approximately centrally between a first face end 108 and a second face end 110 of the second hollow body 102 and, as can be seen in particular in FIGS. 4a, b, is aligned as far as possible coaxially with respect to a cutout 113 formed in the side wall 107 of the second hollow body 102. The first hollow body 101 and the second hollow body 102 are aligned at an angle α with respect to one another, which angle may for example lie in a range around 90°.

As is also shown in FIGS. 4a, b, the weld seam 109 in interaction with the diameters of the first and second hollow bodies 101, 102 defines a region in which weld spatter can be expected to be deposited when the weld seam 109 is generated. This area can be approximately characterized by a scatter angle β, which extends from the weld seam 109. Because of the difficulty in predicting the flight of the weld spatter, a first wall region 116 is defined which extends to a predefined extent to both sides of the weld seam 109 and covers substantially the entire circumference of the inner region of the second hollow body. Adjacent to this first wall region, respective second wall regions 114a, b extend to both sides of the second hollow body 102.

The collecting container 53 is positioned substantially centrally below the weld seam 109 in the first wall region 116 and ensures that preferably all weld spatter has been collected after the welding process. The advantage that results from this is that, averaged over the entire area of the wall region with the exception of the root of the weld seam itself, in each case as before, the same surface roughness is present as in the adjacent wall regions 114*a*, *b* in which even otherwise no weld spatter would have accumulated.

As can be seen from the projection illustration as per FIG. 4*b*, the collecting container 53 is, in terms of its dimensions, in particular with regard to its width b and its length l, duly smaller than the maximum surface area defined by the scatter angle β on the pipe side situated opposite the weld seam 109. Owing to its positioning with a (radial) spacing d to the point at which the weld seam 109 is generated, the collecting container 53 can nevertheless collect all weld spatter.

FIGS. 5*a*-*e* and 6*a*-*e* show various details relating to the positioning of the hollow bodies relative to one another and relating to the selection of the form of the weld seam, in each case along the section plane A-A.

FIGS. 5*a*-*e* show different arrangement variants of the first and second hollow bodies 101, 102 with respect to one another, and with them also different scenarios for the specific shape of the weld seam in the interior of the pipeline element 100 (cf. FIGS. 1 to 4*b*). FIGS. 5*a*-*e* have in common the fact that the first main body has an edge surface 115 at its second face end 105, and the second hollow body 102 has an edge surface 117 delimiting the cutout 113. The embodiments of FIGS. 5*a*-*e* differ primarily with regard to the arrangement of the edge surfaces 115, 117 with respect to one another.

Figure 5A:
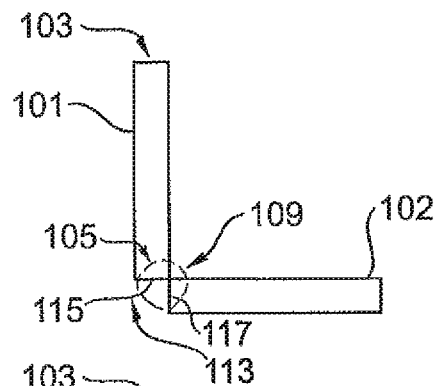

FIG. 5*a* firstly shows that the edge surface 115 of the first hollow body 101 protrudes into the opening 113 defined by the edge surface of the second hollow body 102. Preferably, the first hollow body 101 and the second hollow body 102 are aligned with one another, and the cutout 113 in the second hollow body 102 is dimensioned, such that the edge surface 115 of the first hollow body 101 is connected only at the outer encircling edge to the second hollow body 102, or extends entirely within the cutout 113. In this way, in order to attain a fully encircling weld seam, only relatively material has to be melted on, and rapid working operation is made possible. In the ideal case, with an arrangement as per FIG. 5*a*, a weld seam as illustrated in FIG. 6*a* can be generated. Here, the "ideal case" is to be understood to mean a correct selection of a predefined set of parameters which take into consideration the exact dimensions of the hollow bodies 101 and 102 and the position of the edge surfaces 115, 117.

Figure 5B:
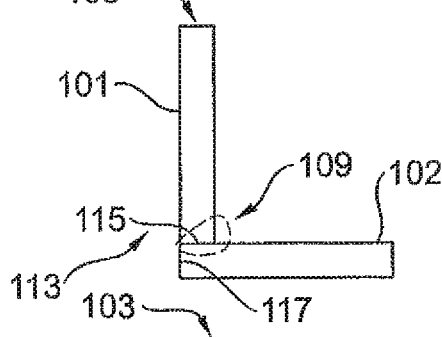

By contrast to FIG. 5*a*, in FIG. 5*b* the first hollow body is selected to be somewhat larger in terms of its diameter, at any rate relative to the diameter of the cutout 113. The edge surface 115 lies against the outside of the second hollow body 102. The inside of the wall of the first hollow body 101 preferably terminates flush with the edge surface 117 of the cutout 113 in the second hollow body 102. With alignment and dimensioning as per FIG. 5*b*, a welding pattern as per FIGS. 6*b*, d is obtained if a corresponding set of parameters is selected.

Figure 5C:
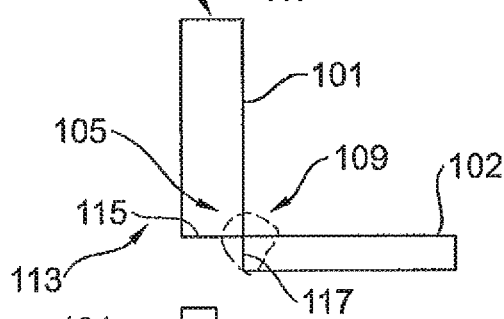

In FIG. 5*c*, an alignment between the first hollow body 101 and the second hollow body 102 has been performed substantially as in FIG. 5*a*, such that the edge surface 115 lies with an externally encircling edge against the edge surface 117 of the second hollow body 102 or is adjacent to the latter there.

By contrast to FIG. 5*a*, however, the material thickness of the first hollow body 101 is greater, such that a weld pattern as per FIG. 6*c* will be established in each case again if the correct set of parameters is selected.

Figure 5D:
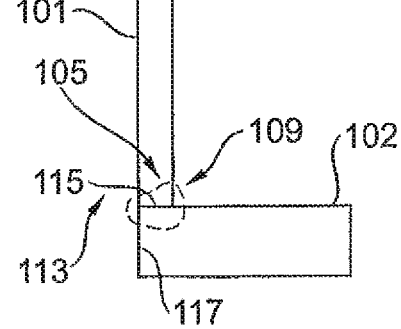

FIG. 5*d* differs from FIG. 5*b* with regard to the dimensioning of the first hollow body relative to the second hollow body. In qualitative terms, the same weld pattern is to be expected here, for which reason reference is made to the statements above and to FIGS. 6*b*, *d*.

Figure 5E:
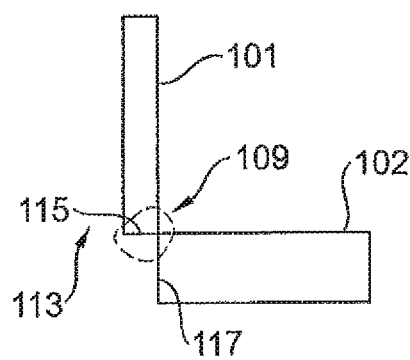

FIG. 5*e* in turn shows an alignment of the first and second hollow bodies 101, 102 relative to one another as were also already selected in FIGS. 5*a* and 5*c*. By contrast to FIGS. 4*d* and 4*c*, the material thickness of the second hollow body 102 has however been selected such that a weld pattern as per FIG. 5*e* is established, provided that the correct set of parameters is selected.

As can be seen from FIG. 6*a*, in the case of the alignment shown in FIG. 5*a*, the hollow bodies 101 and 102 are in the ideal case completely encompassed at edge surfaces 115, 117 by a root 112 of the weld seam 109, such that a smooth transition between an inside 118 of the first hollow body 101 and an inside 119 of the second hollow body 102 is generated. The smooth contour transition between the first and second hollow bodies 101, 102 offers advantages for any type of polymer enhancement, but makes the pipeline element very particularly suitable for polymer enhancement by means of autodeposition, because the flow conditions in the pipe interior are disrupted to a lesser extent owing to the smooth contour transition. The polymer-based layer 111 can ideally be applied to this geometry including the weld seam. In FIGS. 6*b*, *d*, the root 112 of the weld seam 109 likewise runs around the entire circumference along the connection point between the first hollow body 101 and the second hollow body 102. By contrast to FIG. 5*a*, however, only the edge surface 115 of the first hollow body 101 has been completely encompassed by the weld seam 109, whereas the edge surface 117 of the second hollow body 102 has been only partially encompassed. Owing to the alignment and dimensioning between the first hollow body 101 and cutout 113, the root 112 of the weld seam 109 however projects radially inward from the wall 118 of the first hollow body 101 only by a predetermined maximum value h1. h1 preferably lies in a range of 0.7 times the material thickness of the wall 107 or less. The weld seam therefore does not constitute an obstacle to the complete wetting of the inside of the pipeline element with the polymer-based layer 111.

FIG. 6*c* illustrates a variant in which, owing to the material thickness of the first hollow body 101, not the entire edge surface 115 of the first hollow body 101 has been encompassed by the root 112 of the weld seam 109, such that a part, specifically in the region of an inner edge 121, protrudes radially inward from the weld seam 109 in relation to the first hollow body 101. However, as long as the inner edge 121 is spaced apart from the weld 109 by no more than a predetermined maximum value h2, the threshold for the flow resistance resulting from the remaining edge surface 115 is within tolerable limits. Furthermore, complete wetting of the inside of the pipeline element with the polymer-based layer 111 is not significantly impaired as a result. The value h2 preferably lies in a range of 0.5 times the difference in the wall thickness of the walls 107, if they have the same wall thickness, or less. Alternatively, h2 is preferably less than the difference between the two wall thicknesses of the hollow bodies 101, 102, if the wall thicknesses are different from one another.

FIG. 6*e* is an illustration analogous to FIG. 6*c*, in which, owing to the material thickness of one of the hollow bodies, in this case of the second hollow body 10, no complete encompassment of both edge surfaces of the first hollow body 101 and of the second hollow body 102 is realized. In this case, it is an inner edge 123 at the cutout 113 in the second hollow body 102 that is spaced apart from the root 112 of the weld seam 109 by a predetermined value h3, such that a part of the edge surface 117 of the second hollow body 102 is still visible. However, if the value h3 does not exceed a predetermined maximum value, preferably determined as h2 above, the complete formation of a polymer-based layer 111 is not hindered, and also the flow conditions are not inadmissibly impaired. The advantages of the embodiments as per FIGS. 6c and 6e lie in technically significantly easier controllability. The diameter and material thickness tolerances of the first hollow body 101 and the second hollow body 102 can be dimensioned more generously than in the embodiments of FIGS. 6a and 6b, d, which simplifies the preselection of suitable sets of parameters.

In summary, with the invention, it has been possible for the first time to expand the field of application of polymer enhancement to also include complex pipeline elements with one or more welded connections. Where the prior art has hitherto still prevented successful coating on the inside of the pipeline elements owing to poor quality of the weld seams, the invention proposes an advantageous further development. Through the targeted collection of weld spatter in the vicinity of the root of the weld seam, the surface quality of the pipeline element in the interior is improved.

LIST OF UTILIZED REFERENCE NUMBERS 1-29 Method steps
50 Guide rail
51 Collecting container
53 Main body
55 Lance
100 Pipeline element
101 First hollow body
102 Second hollow body
103 First face end, first hollow body
105 Second face end, first hollow body
107 Wall, hollow body
108 First face end, second hollow body
109 Weld seam
110 Second face end, second hollow body
111 Polymer-based layer
112 Root, weld seam
113 Cutout
114a, b Second wall region
115 Edge surface, first hollow body
116 First wall region
117 Edge surface, second hollow body
118 Inside, first hollow body
121 Inner edge, first hollow body
123 Inner edge, second hollow body
A Longitudinal axis
S Welding zone
l Length, collecting container
b Width, collecting container
d Spacing
$h_1, h_2, h_3$ Predetermined maximum value
$\alpha, \beta$ Angle

The invention claimed is:

1. A method for producing a pipeline element of a fire extinguishing installation, comprising:
providing a first hollow body and a second hollow body,
positioning the hollow bodies relative to one another in a welding zone such that a connection of the hollow bodies can be performed in the welding zone,
positioning a collecting container within the first and/or second hollow body in a region of the welding zone,
welding the first hollow body to the second hollow body in the welding zone such that the pipeline element is obtained, wherein a fully encircling weld seam is generated which has a root extending on an inside of the pipeline element,
collecting, by the collecting container, weld spatter that occurs on the inside of the pipeline element during the welding the first hollow body to the second hollow body, and
applying a polymer-based layer to the inside of the pipeline element, wherein the polymer-based layer completely covers the inside of the pipeline element and the root of the weld seam;
wherein application of the polymer-based layer is performed by dipping of the pipeline element into a dip bath which contains a corresponding coating material.

2. The method as claimed in claim 1, wherein the weld seam is generated by a welding tool and/or the first and second hollow bodies being moved relative to one another such that a welding point describes a path along the first and second hollow bodies, and the collecting container is positioned substantially opposite the welding point.

3. The method as claimed in claim 1, wherein the positioning of the collecting container comprises introducing the collecting container within the respective hollow body into the region of the welding zone from a face end of the first or second hollow body.

4. The method as claimed in claim 3, wherein the positioning of the collecting container comprises moving the collecting container by a lance with a spacing to a wall of the respective hollow body.

5. The method as claimed in claim 3, wherein, before the introducing the collecting container, the positioning the collection container comprises introducing a guide rail into the respective hollow body.

6. The method as claimed in claim 5, wherein the guide rail lies against a wall of the respective hollow body.

7. The method as claimed in claim 1, wherein the collecting container comprises a length in an introduction direction which corresponds at least to a diameter of that hollow body into which the collecting container is introduced and which corresponds, in a range from 1.5 to 3.0 times, to a largest diameter of that hollow body into which the collecting container is introduced.

8. The method as claimed in claim 1, wherein the collecting container comprises a width transversely with respect to an introduction direction which corresponds at least to 0.3 times a diameter of that hollow body into which the collecting container is introduced and which corresponds, in a range from 0.5 to 1.0 times, to the diameter of that hollow body into which the collecting container is introduced.

9. The method as claimed in claim 1, wherein the collecting container comprises a width transversely with respect to an introduction direction, and in the welding zone assumes a spacing to a welding point, wherein a ratio of the width to the spacing lies in a range of 0.5 to 3.5.

10. The method as claimed in claim 1, wherein the first and second hollow bodies each comprises a wall, and the wall comprises an encircling edge surface, and the method comprises:

aligning the encircling edge surface of the first hollow body and the encircling edge surface of the second hollow body with one another, and generating the weld seam along the encircling edge surfaces.

11. The method as claimed in claim 10, wherein the encircling edge surface of the first hollow body is formed at a face end of the hollow body.

12. The method as claimed in claim 11, wherein the encircling edge surface of the second hollow body
   a) is spaced apart from face ends of the second hollow body and defines a cutout through the wall of the second hollow body, or
   b) is formed at a face end of the second hollow body.

13. The method as claimed in claim 10, furthermore comprising:
   generating at least one of the encircling edge surfaces of the first and/or second hollow body by plasma cutting, wherein the positioning the collecting container is performed before the generation of at least one of the encircling edge surfaces, and
   wherein the method comprises at least one of:
   collecting, by the collecting container, cut-out material that arises during the generation of at least one of the encircling edge surfaces of the first and/or second hollow body, and/or
   cleaning at least one of the encircling edge surfaces, before the welding, after the plasma cutting.

14. The method as claimed in claim 1, wherein the hollow bodies are formed from a metal suitable for chemical autodeposition including a ferrous and/or zinc-containing metal, and the applying the polymer-based layer to the inside of the pipeline element comprises:
   coating by chemical autodeposition by the dipping of the pipeline element into the dip bath, wherein the corresponding coating material comprises a polymer-based chemical autodeposition material.

15. The method as claimed in claim 14, wherein the autodeposition material comprises polymer constituents which are ionically bonded to a wall of the hollow bodies and to the root of the weld seam, and is present as an aqueous emulsion or dispersion.

16. The method as claimed in claim 15, wherein the autodeposition material comprises, as polymer constituent, one or more autodepositionable polymers selected from the list comprising:
   i) epoxides,
   ii) acrylates,
   iii) styrene acrylates,
   iv) epoxy acrylates,
   v) isocyanates, urethanes, or polyurethanes,
   vi) polymers with a vinyl group or polyvinylidene chloride, or
   iv) a combination of two or more of i), ii) or iii), which are crosslinked to one another via an isocyanate or via a urethane.

17. The method as claimed in claim 14, wherein the autodeposition material is acidic, comprises a pH value in a range from 1 to 5, and comprises a starter material in the form of metal halides.

18. The method as claimed in claim 14, wherein the dipping is continued in one or more dipping processes until such time as the polymer-based layer applied to the inside of the pipeline element has a thickness in a range from 7 µm to 80 µm.

19. A method for producing a pipeline element of a fire extinguishing installation, comprising:
   providing a first hollow body and a second hollow body,
   positioning the hollow bodies relative to one another in a welding zone such that a connection of the hollow bodies can be performed in the welding zone,
   positioning a collecting container within the first and/or second hollow body in a region of the welding zone,
   welding the first hollow body to the second hollow body in the welding zone such that the pipeline element is obtained, wherein a fully encircling weld seam is generated which has a root extending on an inside of the pipeline element, and
   collecting, by the collecting container, weld spatter that occurs on the inside of the pipeline element during the welding the first hollow body to the second hollow body,
   wherein the positioning of the collecting container comprises introducing the collecting container within the respective hollow body into the region of the welding zone from a face end of the first or second hollow body, and
   wherein the positioning of the collecting container comprises moving the collecting container by a lance with a spacing to a wall of the respective hollow body.

20. The method as claimed in claim 19, wherein the method comprises a method for producing a polymer-enhanced pipeline element of a fire extinguishing installation, and furthermore comprises:
   applying a polymer-based layer to the inside of the pipeline element, wherein the polymer-based layer completely covers the inside of the pipeline element and the root of the weld seam.

21. A method for producing a pipeline element of a fire extinguishing installation, comprising:
   providing a first hollow body and a second hollow body,
   positioning the hollow bodies relative to one another in a welding zone such that a connection of the hollow bodies can be performed in the welding zone,
   positioning a collecting container within the first and/or second hollow body in a region of the welding zone,
   welding the first hollow body to the second hollow body in the welding zone such that the pipeline element is obtained, wherein a fully encircling weld seam is generated which has a root extending on an inside of the pipeline element,
   collecting, by the collecting container, weld spatter that occurs on the inside of the pipeline element during the welding the first hollow body to the second hollow body,
   wherein the positioning the collecting container comprises:
      introducing a guide rail into the first and/or second hollow body, and
      introducing the collecting container within the respective hollow body into the welding zone from a face end of the first or second hollow body.

22. The method as claimed in claim 21, wherein the method comprises a method for producing a polymer-enhanced pipeline element of a fire extinguishing installation, and furthermore comprises:
   applying a polymer-based layer to the inside of the pipeline element, wherein the polymer-based layer completely covers the inside of the pipeline element and the root of the weld seam.

23. A method for producing a pipeline element of a fire extinguishing installation, comprising:
   providing a first hollow body and a second hollow body, positioning the hollow bodies relative to one another in a welding zone such that a connection of the hollow bodies can be performed in the welding zone, positioning a collecting container within the first and/or second hollow body in a region of the welding zone, welding the first hollow body to the second hollow body in the welding zone such that the pipeline element is obtained, wherein a fully encircling weld seam is generated which has a root extending on an inside of the pipeline element, and collecting, by the collecting container, weld spatter that occurs on the inside of the pipeline element during the welding the first hollow body to the second hollow body, wherein the positioning the hollow bodies relative to one another in a welding zone such that the connection of the hollow bodies can be performed in the welding zone, comprises:

providing a wall of each of the first and second hollow bodies with an encircling edge surface, generating at least one of the encircling edge surfaces of the first and/or second hollow body by plasma cutting, aligning the encircling edge surface of the wall of the first hollow body and the encircling edge surface of the wall of the second hollow body with one another, and generating the weld seam along the encircling edge surfaces; and wherein the positioning the collecting container occurs prior to generating the weld seam along the encircling edge surfaces, and comprises at least one of:

collecting, by the collecting container, cut-out material that arises during the generation of the at least one of the encircling edge surfaces of the first and/or second hollow body, and/or cleaning at least one of the encircling edge surfaces, before the welding, after the plamsa cutting.

24. The method as claimed in claim 23, wherein the method comprises a method for producing a polymer-enhanced pipeline element of a fire extinguishing installation, and furthermore comprises:

applying a polymer-based layer to the inside of the pipeline element, wherein the polymer-based layer completely covers the inside of the pipeline element and the root of the weld seam.

\* \* \* \* \*